Feb. 13, 1923.
P. J. F. BATENBURG
TORQUE TUBE MOUNTING
Filed Apr. 9, 1921
1,445,125
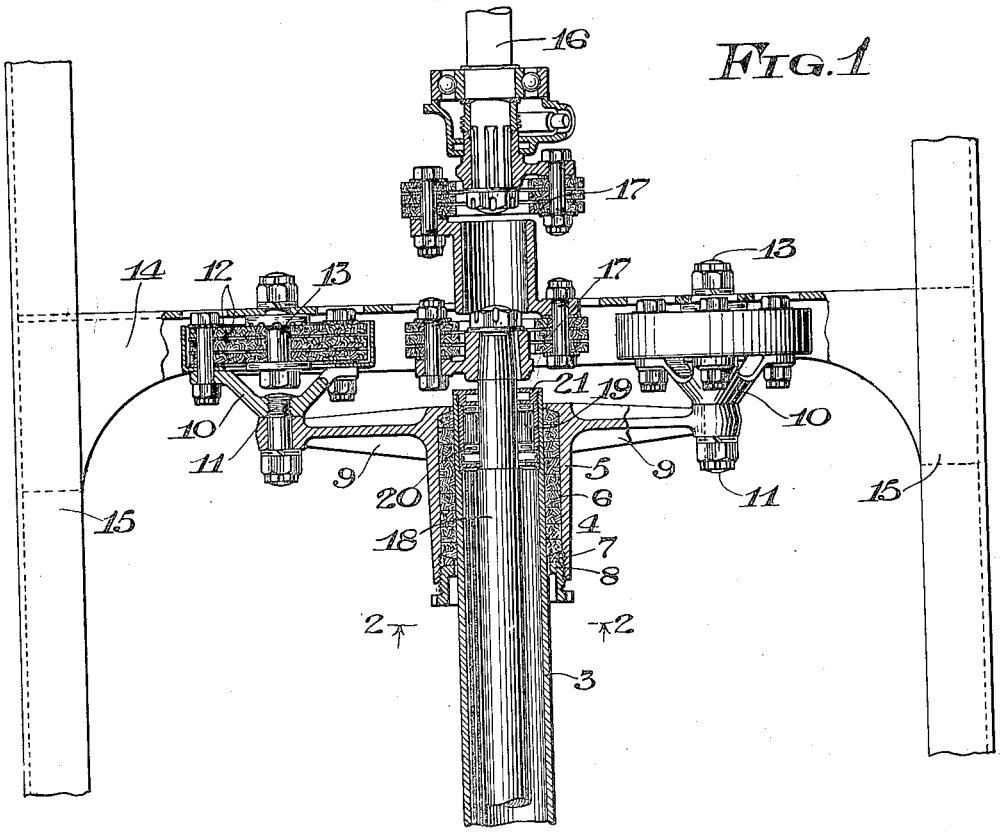
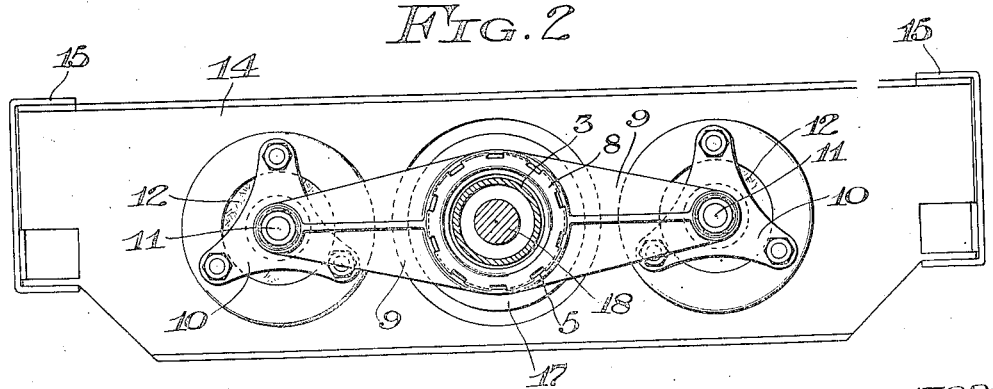
WITNESSES
H. D. Chase
C. L. Naal
INVENTOR
Peter J. F. Batenburg
By R. S. Caldwell
ATTORNEY Patented Feb. 13, 1923.

1,445,125

UNITED STATES PATENT OFFICE.

PETER J. F. BATENBURG, OF RACINE, WISCONSIN, ASSIGNOR TO MITCHELL MOTORS COMPANY, INC., OF RACINE, WISCONSIN, A CORPORATION OF NEW YORK.

TORQUE-TUBE MOUNTING.

Application filed April 9, 1921. Serial No. 460,111.

*To all whom it may concern:*

Be it known that I, PETER J. F. BATENBURG, a subject of Queen Wilhelmina of the Netherlands, and resident of Racine, in the county of Racine and State of Wisconsin, have invented new and useful Improvements in Torque-Tube Mountings, of which the following is a description, reference being had to the accompanying drawings, which are a part of this specification.

The invention relates to a torque tube mounting for automotive vehicles.

In automotive vehicles where the rear axle is connected to the frame of the vehicle through springs alone, it is necessary to provide means for allowing the rear axle to move vertically to accommodate obstructions in or unevenness of the road surface and to take up the torque. To accomplish this purpose, I have provided a torque tube with a mounting for the same of novel construction.

A further object of the invention is to provide a simple and effective bearing for the front end of the torque tube insuring proper lubrication thereof and obviating special fitting.

The invention further consists in the several features hereinafter set forth and more particularly defined by claims at the conclusion hereof.

In the drawings: Fig. 1 is a view partly in elevation and partly in section of a device embodying the invention; Fig. 2 is a section taken on the line 2—2 of Fig. 1.

In the drawings the numeral 3 designates the torque tube, whose front end, in the present instance, is mounted in a stuffing box 4 formed by bearing housing 5, packing 6, a follower ring 7 and a gland nut 8. The front end of the tube 3 may turn and slide lengthwise in said bearing and its outer surface, surrounded by the packing 6, need not be especially machined for this purpose. The packing 6 is preferably of the graphite impregnated type so that the box is self-lubricating.

In order that the front end of the torque tube may have limited movements to accommodate for the action of the rear axle, where such axle is connected to the vehicle frame solely by the supporting springs, the housing 5 is provided with laterally extending arms 9, the ends of which have spiders 10 secured thereto by bolts 11. A series of flexible disks 12 are secured to each spider 10 and a bolt 13 passing through the disks 12 operatively connects them with a part of the frame of the machine, the bolts 13 being shown as carried by a transverse frame member 14 secured to the side bars 15 of the vehicle. This construction provides a flexible joint connection between the support for the front end of the torque tube and the frame of the vehicle, affording a limited swinging movement of the front end of the torque tube in all directions.

The shaft 16 driven by the engine is operatively connected by one or more universal joint connections 17, of usual construction, to the transmission shaft 18 within the torque tube and extending to the rear axle. Where the connection between the torque tube and the rear axle is a slip joint, then only one of the connections 17 need be used, but where the torque tube is fixed at its rear end to the differential housing of the rear axle, then a pair of universal joints 17 are used, as will be readily understood by those skilled in this art.

A roller bearing 19 for the front end of the shaft 18 is mounted in the front end of the torque tube 3 between a thrust collar 20 and a removable cap 21.

Under running conditions the torque set up by the turning of the live axle or axles within the rear axle housing has a tendency to move the front end of the torque tube in a vertical plane and in the present construction such movement is accommodated by the slip joint connection between said tube and the support formed by the housing 5 and by the flexible connection between said support and the vehicle frame. When the rear axle moves up and down, due to obstructions in or unevenness of the road surface, this slip joint and the flexible connection of the housing 5 with the frame accommodates these movements. Limited movement of the front end of the torque tube in a horizontal plane is also permitted by the flexible connection of said tube with the frame. The front end of the torque tube may also turn in the bearing provided for it in the housings.

Another feature of advantage of the above construction is that it permits the whole rear axle assembly together with the torque tube being removed from the vehicle when said axle is disconnected from the springs or frame and the shaft 18 from the joint 17.

I desire it to be understood that this invention is not to be limited to any specific form or arrangement of parts except in so far as such limitations are specified in the claims.

What I claim as my invention is:

1. In an automotive vehicle, the combination with the torque tube, of a support for the front end of said tube operatively connected to the frame of the vehicle, said support having a bearing housing and a self-lubricating packing within said housing and surrounding said tube and spacing it from said housing.

2. In an automotive vehicle, the combination, with the torque tube and the frame of the vehicle, of a support in which the front end of said tube is mounted and having outwardly extending arms, and flexible universal joints connecting said arms with the frame of the vehicle.

3. In an automotive vehicle, the combination, with the torque tube and the frame of the vehicle, of a support in which the front end of said tube is journalled and having outwardly extending arms, and yieldingly flexible joints connecting said arms with the frame of the vehicle.

4. In an automotive vehicle, the combination, with the torque tube and the vehicle frame, of a support in which the front end of said tube is journalled and having outwardly extending arms, and yieldingly flexible universal joints connecting said arms with the frame of the vehicle.

5. In an automotive vehicle, the combination, with the torque tube and the vehicle frame, of a support in which the front end of said tube is journalled and having substantially horizontally disposed laterally extending arms, and a series of flexible disks operatively connected to each arm and to said frame to form flexible universal joint connections between said tube and the vehicle frame.

In testimony whereof, I affix my signature, in presence of two witnesses.

PETER J. F. BATENBURG.

Witnesses:
L. S. NOLD,
PRESTON H. BREED.